United States Patent
Stanley, II

(10) Patent No.: US 10,509,643 B2
(45) Date of Patent: Dec. 17, 2019

(54) DATA PROCESSING WITH A PLANE COMPUTER

(71) Applicant: Robert Elliott Stanley, II, Chico, CA (US)

(72) Inventor: Robert Elliott Stanley, II, Chico, CA (US)

( * ) Notice: Subject to any disclaimer, the term of this patent is extended or adjusted under 35 U.S.C. 154(b) by 43 days.

(21) Appl. No.: 15/239,540

(22) Filed: Aug. 17, 2016

(65) Prior Publication Data

US 2017/0053126 A1    Feb. 23, 2017

Related U.S. Application Data

(60) Provisional application No. 62/282,951, filed on Aug. 17, 2015.

(51) Int. Cl.
*G06F 21/00* (2013.01)
*G06F 8/70* (2018.01)

(52) U.S. Cl.
CPC ..................... *G06F 8/70* (2013.01)

(58) Field of Classification Search
CPC .... G06F 15/80; G06F 15/8023; G06F 15/173; G06F 15/17318; G06F 15/17337; G06F 15/17381; G06F 15/803
See application file for complete search history.

(56) References Cited

U.S. PATENT DOCUMENTS

| | | | |
|---|---|---|---|
| 8,745,603 B2 | 6/2014 | McGuire et al. | |
| 8,930,956 B2 * | 1/2015 | Blocksome | G06F 9/544 718/100 |
| 8,959,524 B2 | 2/2015 | Hirsch et al. | |
| 2009/0055474 A1 * | 2/2009 | Archer | G06F 15/173 709/204 |
| 2013/0198754 A1 * | 8/2013 | Hirsch | G06F 9/5066 718/104 |

* cited by examiner

*Primary Examiner* — Ghazal B Shehni
(74) *Attorney, Agent, or Firm* — Ariel S. Bentolila; Bay Area IP Group, LLC

(57) ABSTRACT

Lines of code/data may be processed on one or more planes, wherein a predetermined number of processors may process each line of code/data within the one or more planes. Additionally, each line of code may be processed with their own processor on a plane. Furthermore, a multiplicity of planes of processors may be stacked such that within each plane, thousands of lines of code may be processed separately and simultaneously by each one and/or a group of the predetermined number processors to provide great encryption abilities. In addition, each processor may be programmed differently and/or separately because each line of codes are processed separately. Processing of each line of code separately with different processors alleviates hacking of the system because each processor only reads or executes lines of code in it's assigned plane.

20 Claims, 7 Drawing Sheets

100

DATA PROCESSING WITH A PLANE COMPUTER

CROSS-REFERENCE TO RELATED APPLICATIONS

The present Utility patent application claims priority benefit of the [U.S. provisional application patent Ser. No. 62/282,951 entitled "PLANE COMPUTER" filed 17 Aug. 2015 under 35 U.S.C. 119(e). The contents of this related provisional application are incorporated herein by reference for all purposes to the extent that such subject matter is not inconsistent herewith or limiting hereof.

RELATED CO-PENDING U.S. PATENT APPLICATIONS

Not applicable.

FEDERALLY SPONSORED RESEARCH OR DEVELOPMENT

Not applicable.

REFERENCE TO SEQUENCE LISTING, A TABLE, OR A COMPUTER LISTING APPENDIX

Not applicable.

COPYRIGHT NOTICE

A portion of the disclosure of this patent document contains material that is subject to copyright protection by the author thereof. The copyright owner has no objection to the facsimile reproduction by anyone of the patent document or patent disclosure for the purposes of referencing as patent prior art, as it appears in the Patent and Trademark Office, patent file or records, but otherwise reserves all copyright rights whatsoever.

BACKGROUND OF THE RELEVANT PRIOR ART

One or more embodiments of the invention generally relate to a computer processing architecture. More particularly, certain embodiments of the invention relates to parallel computer processing.

The following background information may present examples of specific aspects of the prior art (e.g., without limitation, approaches, facts, or common wisdom) that, while expected to be helpful to further educate the reader as to additional aspects of the prior art, is not to be construed as limiting the present invention, or any embodiments thereof. The following is an example of a specific aspect in the prior art that, while expected to be helpful to further educate the reader as to additional aspects of the prior art, is not to be construed as limiting the present invention, or any embodiments thereof, to anything stated or implied therein or inferred thereupon. By way of educational background, another aspect of the prior art generally useful to be aware of is that conventional computers may include a computer processor that may read and execute a multiplicity of lines of software, wherein the software may be in a form of computer-readable instructions (code) that when executed may cause the conventional computers to possibly carry out tasks such as, data receiving, data storage, data processing, computations, data sending, data display, and further transmitting computer-readable instructions to other computing devices, etc. Typically, the reading and executing of the multiplicity of lines of code may be performed by a conventional single computer processor, processing down the software, one line of code at a time. FIG. 1 illustrates an exemplary conventional computer processing technique illustrating a general processing direction of code. More particularly, and by way of example, for exemplary software comprising two lines of code, the single processor may read across a first line of code to execute the first line of code, then proceed down to a second line of code, and may read across the second line of code, to execute the second line of code. In cases where software may comprise more lines of code, a conventional processor may continue in this fashion by reading/executing across each line of code before proceeding down to a next line of code and repeating the process. It may be contemplated that for large amounts of software, comprising many lines of code to be read and processed, a single processor possibly reading and executing the large amount of software may be conceptually perceived as data going through an hour glass. Some conventional computers may process eight parallel lines of code, while other conventional computers may consist of a multi-processor ring and star topology.

In view of the foregoing, it is clear that these traditional techniques are not perfect and leave room for more optimal approaches.

BRIEF DESCRIPTION OF THE DRAWINGS

The present invention is illustrated by way of example, and not by way of limitation, in the figures of the accompanying drawings and in which like reference numerals refer to similar elements and in which.

Figure 1:
FIG. 1 illustrates an exemplary conventional computer processing technique illustrating a general processing direction of code.

Unless otherwise indicated illustrations in the figures are not necessarily drawn to scale.

DETAILED DESCRIPTION OF SOME EMBODIMENTS

The present invention is best understood by reference to the detailed figures and description set forth herein.

Embodiments of the invention are discussed below with reference to the Figures. However, those skilled in the art will readily appreciate that the detailed description given herein with respect to these figures is for explanatory purposes as the invention extends beyond these limited embodiments. For example, it should be appreciated that those skilled in the art will, in light of the teachings of the present invention, recognize a multiplicity of alternate and suitable approaches, depending upon the needs of the particular application, to implement the functionality of any given detail described herein, beyond the particular implementation choices in the following embodiments described and shown. That is, there are modifications and variations of the invention that are too numerous to be listed but that all fit within the scope of the invention. Also, singular words should be read as plural and vice versa and masculine as feminine and vice versa, where appropriate, and alternative embodiments do not necessarily imply that the two are mutually exclusive.

It is to be further understood that the present invention is not limited to the particular methodology, compounds, materials, manufacturing techniques, uses, and applications, described herein, as these may vary. It is also to be understood that the terminology used herein is used for the purpose of describing particular embodiments only, and is not intended to limit the scope of the present invention. It must be noted that as used herein and in the appended claims, the singular forms "a," "an," and "the" include the plural reference unless the context clearly dictates otherwise. Thus, for example, a reference to "an element" is a reference to one or more elements and includes equivalents thereof known to those skilled in the art. Similarly, for another example, a reference to "a step" or "a means" is a reference to one or more steps or means and may include sub-steps and subservient means. All conjunctions used are to be understood in the most inclusive sense possible. Thus, the word "or" should be understood as having the definition of a logical "or" rather than that of a logical "exclusive or" unless the context clearly necessitates otherwise. Structures described herein are to be understood also to refer to functional equivalents of such structures. Language that may be construed to express approximation should be so understood unless the context clearly dictates otherwise.

All words of approximation as used in the present disclosure and claims should be construed to mean "approximate," rather than "perfect," and may accordingly be employed as a meaningful modifier to any other word, specified parameter, quantity, quality, or concept. Words of approximation, include, yet are not limited to terms such as "substantial", "nearly", "almost", "about", "generally", "largely", "essentially", "closely approximate", etc.

As will be established in some detail below, it is well settle law, as early as 1939, that words of approximation are not indefinite in the claims even when such limits are not defined or specified in the specification.

For example, see Ex parte Mallory, 52 USPQ 297, 297 (Pat. Off. Bd. App. 1941) where the court said "The examiner has held that most of the claims are inaccurate because apparently the laminar film will not be entirely eliminated. The claims specify that the film is "substantially" eliminated and for the intended purpose, it is believed that the slight portion of the film which may remain is negligible. We are of the view, therefore, that the claims may be regarded as sufficiently accurate."

Note that claims need only "reasonably apprise those skilled in the art" as to their scope to satisfy the definiteness requirement. See Energy Absorption Sys., Inc. v. Roadway Safety Servs., Inc., Civ. App. 96-1264, slip op. at 10 (Fed. Cir. Jul. 3, 1997) (unpublished) Hybridtech v. Monoclonal Antibodies, Inc., 802 F.2d 1367, 1385, 231 USPQ 81, 94 (Fed. Cir. 1986), cert. denied, 480 U.S. 947 (1987). In addition, the use of modifiers in the claim, like "generally" and "substantial," does not by itself render the claims indefinite. See Seattle Box Co. v. Industrial Crating & Packing, Inc., 731 F.2d 818, 828-29, 221 USPQ 568, 575-76 (Fed. Cir. 1984).

Moreover, the ordinary and customary meaning of terms like "substantially" includes "reasonably close to: nearly, almost, about", connoting a term of approximation. See In re Frye, Appeal No. 2009-006013, 94 USPQ2d 1072, 1077, 2010 WL 889747 (B.P.A.I. 2010) Depending on its usage, the word "substantially" can denote either language of approximation or language of magnitude. Deering Precision Instruments, L.L.C. v. Vector Distribution Sys., Inc., 347 F.3d 1314, 1323 (Fed. Cir. 2003) (recognizing the "dual ordinary meaning of th[e] term ["substantially"] as connoting a term of approximation or a term of magnitude"). Here, when referring to the "substantially halfway" limitation, the Specification uses the word "approximately" as a substitute for the word "substantially" (Fact 4). (Fact 4). The ordinary meaning of "substantially halfway" is thus reasonably close to or nearly at the midpoint between the forwardmost point of the upper or outsole and the rearwardmost point of the upper or outsole.

Similarly, the term 'substantially' is well recognized in case law to have the dual ordinary meaning of connoting a term of approximation or a term of magnitude. See Dana Corp. v. American Axle & Manufacturing, Inc., Civ. App. 04-1116, 2004 U.S. App. LEXIS 18265, *13-14 (Fed. Cir. Aug. 27, 2004) (unpublished). The term "substantially" is commonly used by claim drafters to indicate approximation. See Cordis Corp. v. Medtronic AVE Inc., 339 F.3d 1352, 1360 (Fed. Cir. 2003) ("The patents do not set out any numerical standard by which to determine whether the thickness of the wall surface is 'substantially uniform.' The term 'substantially,' as used in this context, denotes approximation. Thus, the walls must be of largely or approximately uniform thickness."); see also Deering Precision Instruments, LLC v. Vector Distribution Sys., Inc., 347 F.3d 1314, 1322 (Fed. Cir. 2003); Epcon Gas Sys., Inc. v. Bauer Compressors, Inc., 279 F.3d 1022, 1031 (Fed. Cir. 2002). We find that the term "substantially" was used in just such a manner in the claims of the patents-in-suit: "substantially uniform wall thickness" denotes a wall thickness with approximate uniformity.

It should also be noted that such words of approximation as contemplated in the foregoing clearly limits the scope of claims such as saying 'generally parallel' such that the adverb 'generally' does not broaden the meaning of parallel. Accordingly, it is well settled that such words of approximation as contemplated in the foregoing (e.g., like the phrase 'generally parallel') envisions some amount of deviation from perfection (e.g., not exactly parallel), and that such words of approximation as contemplated in the foregoing are descriptive terms commonly used in patent claims to avoid a strict numerical boundary to the specified parameter. To the extent that the plain language of the claims relying on such words of approximation as contemplated in the foregoing are clear and uncontradicted by anything in the written description herein or the figures thereof, it is improper to rely upon the present written description, the figures, or the prosecution history to add limitations to any of the claim of the present invention with respect to such words of approximation as contemplated in the foregoing. That is, under such circumstances, relying on the written description and prosecution history to reject the ordinary and customary meanings of the words themselves is impermissible. See, for example, Liquid Dynamics Corp. v. Vaughan Co., 355 F.3d 1361, 69 USPQ2d 1595, 1600-01 (Fed. Cir. 2004). The plain language of phrase 2 requires a "substantial helical flow." The term "substantial" is a meaningful modifier implying "approximate," rather than "perfect." In Cordis Corp. v. Medtronic AVE, Inc., 339 F.3d 1352, 1361 (Fed. Cir. 2003), the district court imposed a precise numeric constraint on the term "substantially uniform thickness." We noted that the proper interpretation of this term was "of largely or approximately uniform thickness" unless something in the prosecution history imposed the "clear and unmistakable disclaimer" needed for narrowing beyond this simple-language interpretation. Id. In Anchor Wall Systems v. Rockwood Retaining Walls, Inc., 340 F.3d 1298, 1311 (Fed. Cir. 2003)" Id. at 1311. Similarly, the plain language of Claim 1 requires neither a perfectly helical flow nor a flow that returns precisely to the center after one rotation (a limitation that arises only as a logical consequence of requiring a perfectly helical flow).

The reader should appreciate that case law generally recognizes a dual ordinary meaning of such words of approximation, as contemplated in the foregoing, as connoting a term of approximation or a term of magnitude; e.g., see Deering Precision Instruments, L.L.C. v. Vector Distrib. Sys., Inc., 347 F.3d 1314, 68 USPQ2d 1716, 1721 (Fed. Cir. 2003), cert. denied, 124 S. Ct. 1426 (2004) where the court was asked to construe the meaning of the term "substantially" in a patent claim. Also see Epcon, 279 F.3d at 1031 ("The phrase 'substantially constant' denotes language of approximation, while the phrase 'substantially below' signifies language of magnitude, i.e., not insubstantial."). Also, see, e.g., Epcon Gas Sys., Inc. v. Bauer Compressors, Inc., 279 F.3d 1022 (Fed. Cir. 2002) (construing the terms "substantially constant" and "substantially below"); Zodiac Pool Care, Inc. v. Hoffinger Indus., Inc., 206 F.3d 1408 (Fed. Cir. 2000) (construing the term "substantially inward"); York Prods., Inc. v. Cent. Tractor Farm & Family Ctr., 99 F.3d 1568 (Fed. Cir. 1996) (construing the term "substantially the entire height thereof"); Tex. Instruments Inc. v. Cypress Semiconductor Corp., 90 F.3d 1558 (Fed. Cir. 1996) (construing the term "substantially in the common plane"). In conducting their analysis, the court instructed to begin with the ordinary meaning of the claim terms to one of ordinary skill in the art. Prima Tek, 318 F.3d at 1148. Reference to dictionaries and our cases indicates that the term "substantially" has numerous ordinary meanings. As the district court stated, "substantially" can mean "significantly" or "considerably." The term "substantially" can also mean "largely" or "essentially." Webster's New 20th Century Dictionary 1817 (1983).

Words of approximation, as contemplated in the foregoing, may also be used in phrases establishing approximate ranges or limits, where the end points are inclusive and approximate, not perfect; e.g., see AK Steel Corp. v. Sollac, 344 F.3d 1234, 68 USPQ2d 1280, 1285 (Fed. Cir. 2003) where it where the court said [W]e conclude that the ordinary meaning of the phrase "up to about 10%" includes the "about 10%" endpoint. As pointed out by AK Steel, when an object of the preposition "up to" is nonnumeric, the most natural meaning is to exclude the object (e.g., painting the wall up to the door). On the other hand, as pointed out by Sollac, when the object is a numerical limit, the normal meaning is to include that upper numerical limit (e.g., counting up to ten, seating capacity for up to seven passengers). Because we have here a numerical limit—"about 10%"—the ordinary meaning is that that endpoint is included.

In the present specification and claims, a goal of employment of such words of approximation, as contemplated in the foregoing, is to avoid a strict numerical boundary to the modified specified parameter, as sanctioned by Pall Corp. v. Micron Separations, Inc., 66 F.3d 1211, 1217, 36 USPQ2d 1225, 1229 (Fed. Cir. 1995) where it states "It is well established that when the term "substantially" serves reasonably to describe the subject matter so that its scope would be understood by persons in the field of the invention, and to distinguish the claimed subject matter from the prior art, it is not indefinite." Likewise see Verve LLC v. Crane Cams Inc., 311 F.3d 1116, 65 USPQ2d 1051, 1054 (Fed. Cir. 2002). Expressions such as "substantially" are used in patent documents when warranted by the nature of the invention, in order to accommodate the minor variations that may be appropriate to secure the invention. Such usage may well satisfy the charge to "particularly point out and distinctly claim" the invention, 35 U.S.C. § 112, and indeed may be necessary in order to provide the inventor with the benefit of his invention. In Andrew Corp. v. Gabriel Elecs. Inc., 847 F.2d 819, 821-22, 6 USPQ2d 2010, 2013 (Fed. Cir. 1988) the court explained that usages such as "substantially equal" and "closely approximate" may serve to describe the invention with precision appropriate to the technology and without intruding on the prior art. The court again explained in Ecolab Inc. v. Envirochem, Inc., 264 F.3d 1358, 1367, 60 USPQ2d 1173, 1179 (Fed. Cir. 2001) that "like the term 'about,' the term 'substantially' is a descriptive term commonly used in patent claims to 'avoid a strict numerical boundary to the specified parameter, see Ecolab Inc. v. Envirochem Inc., 264 F.3d 1358, 60 USPQ2d 1173, 1179 (Fed. Cir. 2001) where the court found that the use of the term "substantially" to modify the term "uniform" does not render this phrase so unclear such that there is no means by which to ascertain the claim scope.

Similarly, other courts have noted that like the term "about," the term "substantially" is a descriptive term commonly used in patent claims to "avoid a strict numerical boundary to the specified parameter."; e.g., see Pall Corp. v. Micron Seps., 66 F.3d 1211, 1217, 36 USPQ2d 1225, 1229 (Fed. Cir. 1995); see, e.g., Andrew Corp. v. Gabriel Elecs. Inc., 847 F.2d 819, 821-22, 6 USPQ2d 2010, 2013 (Fed. Cir. 1988) (noting that terms such as "approach each other," "close to," "substantially equal," and "closely approximate" are ubiquitously used in patent claims and that such usages, when serving reasonably to describe the claimed subject matter to those of skill in the field of the invention, and to distinguish the claimed subject matter from the prior art, have been accepted in patent examination and upheld by the courts). In this case, "substantially" avoids the strict 100% nonuniformity boundary.

Indeed, the foregoing sanctioning of such words of approximation, as contemplated in the foregoing, has been established as early as 1939, see Ex parte Mallory, 52 USPQ 297, 297 (Pat. Off. Bd. App. 1941) where, for example, the court said "the claims specify that the film is "substantially" eliminated and for the intended purpose, it is believed that the slight portion of the film which may remain is negligible. We are of the view, therefore, that the claims may be regarded as sufficiently accurate." Similarly, In re Hutchison, 104 F.2d 829, 42 USPQ 90, 93 (C.C.P.A. 1939) the court said "It is realized that "substantial distance" is a relative and somewhat indefinite term, or phrase, but terms and phrases of this character are not uncommon in patents in cases where, according to the art involved, the meaning can be determined with reasonable clearness."

Hence, for at least the forgoing reason, Applicants submit that it is improper for any examiner to hold as indefinite any claims of the present patent that employ any words of approximation.

Unless defined otherwise, all technical and scientific terms used herein have the same meanings as commonly understood by one of ordinary skill in the art to which this invention belongs. Preferred methods, techniques, devices, and materials are described, although any methods, techniques, devices, or materials similar or equivalent to those described herein may be used in the practice or testing of the present invention. Structures described herein are to be understood also to refer to functional equivalents of such structures. The present invention will be described in detail below with reference to embodiments thereof as illustrated in the accompanying drawings.

References to a "device," an "apparatus," a "system," etc., in the preamble of a claim should be construed broadly to mean "any structure meeting the claim terms" exempt for any specific structure(s)/type(s) that has/(have) been explicitly disavowed or excluded or admitted/implied as prior art in the present specification or incapable of enabling an object/aspect/goal of the invention. Furthermore, where the present specification discloses an object, aspect, function, goal, result, or advantage of the invention that a specific prior art structure and/or method step is similarly capable of performing yet in a very different way, the present invention disclosure is intended to and shall also implicitly include and cover additional corresponding alternative embodiments that are otherwise identical to that explicitly disclosed except that they exclude such prior art structure(s)/step(s), and shall accordingly be deemed as providing sufficient disclosure to support a corresponding negative limitation in a claim claiming such alternative embodiment(s), which exclude such very different prior art structure(s)/step(s) way(s).

From reading the present disclosure, other variations and modifications will be apparent to persons skilled in the art. Such variations and modifications may involve equivalent and other features which are already known in the art, and which may be used instead of or in addition to features already described herein.

Although Claims have been formulated in this Application to particular combinations of features, it should be understood that the scope of the disclosure of the present invention also includes any novel feature or any novel combination of features disclosed herein either explicitly or implicitly or any generalization thereof, whether or not it relates to the same invention as presently claimed in any Claim and whether or not it mitigates any or all of the same technical problems as does the present invention.

Features which are described in the context of separate embodiments may also be provided in combination in a single embodiment. Conversely, various features which are, for brevity, described in the context of a single embodiment, may also be provided separately or in any suitable subcombination. The Applicants hereby give notice that new Claims may be formulated to such features and/or combinations of such features during the prosecution of the present Application or of any further Application derived therefrom.

References to "one embodiment," "an embodiment," "example embodiment," "various embodiments," "some embodiments," "embodiments of the invention," etc., may indicate that the embodiment(s) of the invention so described may include a particular feature, structure, or characteristic, but not every possible embodiment of the invention necessarily includes the particular feature, structure, or characteristic. Further, repeated use of the phrase "in one embodiment," or "in an exemplary embodiment," "an embodiment," do not necessarily refer to the same embodiment, although they may. Moreover, any use of phrases like "embodiments" in connection with "the invention" are never meant to characterize that all embodiments of the invention must include the particular feature, structure, or characteristic, and should instead be understood to mean "at least some embodiments of the invention" includes the stated particular feature, structure, or characteristic.

References to "user", or any similar term, as used herein, may mean a human or non-human user thereof. Moreover, "user", or any similar term, as used herein, unless expressly stipulated otherwise, is contemplated to mean users at any stage of the usage process, to include, without limitation, direct user(s), intermediate user(s), indirect user(s), and end user(s). The meaning of "user", or any similar term, as used herein, should not be otherwise inferred or induced by any pattern(s) of description, embodiments, examples, or referenced prior-art that may (or may not) be provided in the present patent.

References to "end user", or any similar term, as used herein, is generally intended to mean late stage user(s) as opposed to early stage user(s). Hence, it is contemplated that there may be a multiplicity of different types of "end user" near the end stage of the usage process. Where applicable, especially with respect to distribution channels of embodiments of the invention comprising consumed retail products/services thereof (as opposed to sellers/vendors or Original Equipment Manufacturers), examples of an "end user" may include, without limitation, a "consumer", "buyer", "customer", "purchaser", "shopper", "enjoyer", "viewer", or individual person or non-human thing benefiting in any way, directly or indirectly, from use of, or interaction, with some aspect of the present invention.

In some situations, some embodiments of the present invention may provide beneficial usage to more than one stage or type of usage in the foregoing usage process. In such cases where multiple embodiments targeting various stages of the usage process are described, references to "end user", or any similar term, as used therein, are generally intended to not include the user that is the furthest removed, in the foregoing usage process, from the final user therein of an embodiment of the present invention.

Where applicable, especially with respect to retail distribution channels of embodiments of the invention, intermediate user(s) may include, without limitation, any individual person or non-human thing benefiting in any way, directly or indirectly, from use of, or interaction with, some aspect of the present invention with respect to selling, vending, Original Equipment Manufacturing, marketing, merchandising, distributing, service providing, and the like thereof.

References to "person", "individual", "human", "a party", "animal", "creature", or any similar term, as used herein, even if the context or particular embodiment implies living user, maker, or participant, it should be understood that such characterizations are sole by way of example, and not limitation, in that it is contemplated that any such usage, making, or participation by a living entity in connection with making, using, and/or participating, in any way, with embodiments of the present invention may be substituted by such similar performed by a suitably configured non-living entity, to include, without limitation, automated machines, robots, humanoids, computational systems, information processing systems, artificially intelligent systems, and the like. It is further contemplated that those skilled in the art will readily recognize the practical situations where such living makers, users, and/or participants with embodiments of the present invention may be in whole, or in part, replaced with such non-living makers, users, and/or participants with embodiments of the present invention. Likewise, when those skilled in the art identify such practical situations where such living makers, users, and/or participants with embodiments of the present invention may be in whole, or in part, replaced with such non-living makers, it will be readily apparent in light of the teachings of the present invention how to adapt the described embodiments to be suitable for such non-living makers, users, and/or participants with embodiments of the present invention. Thus, the invention is thus to also cover all such modifications, equivalents, and alternatives falling within the spirit and scope of such adaptations and modifications, at least in part, for such non-living entities.

Headings provided herein are for convenience and are not to be taken as limiting the disclosure in any way.

The enumerated listing of items does not imply that any or all of the items are mutually exclusive, unless expressly specified otherwise.

It is understood that the use of specific component, device and/or parameter names are for example only and not meant to imply any limitations on the invention. The invention may thus be implemented with different nomenclature/terminology utilized to describe the mechanisms/units/structures/components/devices/parameters herein, without limitation. Each term utilized herein is to be given its broadest interpretation given the context in which that term is utilized.

Terminology. The following paragraphs provide definitions and/or context for terms found in this disclosure (including the appended claims):

"Comprising." This term is open-ended. As used in the appended claims, this term does not foreclose additional structure or steps. Consider a claim that recites: "A memory controller comprising a system cache . . . " Such a claim does not foreclose the memory controller from including additional components (e.g., a memory channel unit, a switch).

"Configured To." Various units, circuits, or other components may be described or claimed as "configured to" perform a task or tasks. In such contexts, "configured to" or "operable for" is used to connote structure by indicating that the mechanisms/units/circuits/components include structure (e.g., circuitry and/or mechanisms) that performs the task or tasks during operation. As such, the mechanisms/unit/circuit/component can be said to be configured to (or be operable) for perform(ing) the task even when the specified mechanisms/unit/circuit/component is not currently operational (e.g., is not on). The mechanisms/units/circuits/components used with the "configured to" or "operable for" language include hardware—for example, mechanisms, structures, electronics, circuits, memory storing program instructions executable to implement the operation, etc. Reciting that a mechanism/unit/circuit/component is "configured to" or "operable for" perform(ing) one or more tasks is expressly intended not to invoke 35 U.S.C. .sctn.112, sixth paragraph, for that mechanism/unit/circuit/component. "Configured to" may also include adapting a manufacturing process to fabricate devices or components that are adapted to implement or perform one or more tasks.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

The terms "a", "an" and "the" mean "one or more", unless expressly specified otherwise.

Unless otherwise indicated, all numbers expressing conditions, concentrations, dimensions, and so forth used in the specification and claims are to be understood as being modified in all instances by the term "about." Accordingly, unless indicated to the contrary, the numerical parameters set forth in the following specification and attached claims are approximations that may vary depending at least upon a specific analytical technique.

The term "comprising," which is synonymous with "including," "containing," or "characterized by" is inclusive or open-ended and does not exclude additional, unrecited elements or method steps. "Comprising" is a term of art used in claim language which means that the named claim elements are essential, but other claim elements may be added and still form a construct within the scope of the claim.

As used herein, the phase "consisting of" excludes any element, step, or ingredient not specified in the claim. When the phrase "consists of" (or variations thereof) appears in a clause of the body of a claim, rather than immediately following the preamble, it limits only the element set forth in that clause; other elements are not excluded from the claim as a whole. As used herein, the phase "consisting essentially of" and "consisting of" limits the scope of a claim to the specified elements or method steps, plus those that do not materially affect the basis and novel characteristic(s) of the claimed subject matter (see Norian Corp. v Stryker Corp., 363 F.3d 1321, 1331-32, 70 USPQ2d 1508, Fed. Cir. 2004). Moreover, for any claim of the present invention which claims an embodiment "consisting essentially of" or "consisting of" a certain set of elements of any herein described embodiment it shall be understood as obvious by those skilled in the art that the present invention also covers all possible varying scope variants of any described embodiment(s) that are each exclusively (i.e., "consisting essentially of") functional subsets or functional combination thereof such that each of these plurality of exclusive varying scope variants each consists essentially of any functional subset(s) and/or functional combination(s) of any set of elements of any described embodiment(s) to the exclusion of any others not set forth therein. That is, it is contemplated that it will be obvious to those skilled how to create a multiplicity of alternate embodiments of the present invention that simply consisting essentially of a certain functional combination of elements of any described embodiment(s) to the exclusion of any others not set forth therein, and the invention thus covers all such exclusive embodiments as if they were each described herein.

With respect to the terms "comprising," "consisting of" and "consisting essentially of" where one of these three terms is used herein, the presently disclosed and claimed subject matter may include the use of either of the other two terms. Thus in some embodiments not otherwise explicitly recited, any instance of "comprising" may be replaced by "consisting of" or, alternatively, by "consisting essentially of", and thus, for the purposes of claim support and construction for "consisting of" format claims, such replacements operate to create yet other alternative embodiments "consisting essentially of" only the elements recited in the original "comprising" embodiment to the exclusion of all other elements.

Devices or system modules that are in at least general communication with each other need not be in continuous communication with each other, unless expressly specified otherwise. In addition, devices or system modules that are in at least general communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

As is well known to those skilled in the art many careful considerations and compromises typically must be made when designing for the optimal manufacture of a commercial implementation any system, and in particular, the embodiments of the present invention. A commercial implementation in accordance with the spirit and teachings of the present invention may configured according to the needs of the particular application, whereby any aspect(s), feature(s), function(s), result(s), component(s), approach(es), or step(s) of the teachings related to any described embodiment of the present invention may be suitably omitted, included, adapted, mixed and matched, or improved and/or optimized by those skilled in the art, using their average skills and known techniques, to achieve the desired implementation that addresses the needs of the particular application.

In the following description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still cooperate or interact with each other.

A "computer" may refer to one or more apparatus and/or one or more systems that are capable of accepting a structured input, processing the structured input according to prescribed rules, and producing results of the processing as output. Examples of a computer may include: a computer; a stationary and/or portable computer; a computer having a single processor, multiple processors, or multi-core processors, which may operate in parallel and/or not in parallel; a general purpose computer; a supercomputer; a mainframe; a super mini-computer; a mini-computer; a workstation; a micro-computer; a server; a client; an interactive television; a web appliance; a telecommunications device with internet access; a hybrid combination of a computer and an interactive television; a portable computer; a tablet personal computer (PC); a personal digital assistant (PDA); a portable telephone; application-specific hardware to emulate a computer and/or software, such as, for example, a digital signal processor (DSP), a field-programmable gate array (FPGA), an application specific integrated circuit (ASIC), an application specific instruction-set processor (ASIP), a chip, chips, a system on a chip, or a chip set; a data acquisition device; an optical computer; a quantum computer; a biological computer; and generally, an apparatus that may accept data, process data according to one or more stored software programs, generate results, and typically include input, output, storage, arithmetic, logic, and control units.

Those of skill in the art will appreciate that where appropriate, some embodiments of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Where appropriate, embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

"Software" may refer to prescribed rules to operate a computer. Examples of software may include: code segments in one or more computer-readable languages; graphical and or/textual instructions; applets; pre-compiled code; interpreted code; compiled code; and computer programs.

The example embodiments described herein can be implemented in an operating environment comprising computer-executable instructions (e.g., software) installed on a computer, in hardware, or in a combination of software and hardware. The computer-executable instructions can be written in a computer programming language or can be embodied in firmware logic. If written in a programming language conforming to a recognized standard, such instructions can be executed on a variety of hardware platforms and for interfaces to a variety of operating systems. Although not limited thereto, computer software program code for carrying out operations for aspects of the present invention can be written in any combination of one or more suitable programming languages, including an object oriented programming languages and/or conventional procedural programming languages, and/or programming languages such as, for example, Hyper text Markup Language (HTML), Dynamic HTML, Extensible Markup Language (XML), Extensible Stylesheet Language (XSL), Document Style Semantics and Specification Language (DSSSL), Cascading Style Sheets (CSS), Synchronized Multimedia Integration Language (SMIL), Wireless Markup Language (WML), Java™, Jini™, C, C++, Smalltalk, Perl, UNIX Shell, Visual Basic or Visual Basic Script, Virtual Reality Markup Language (VRML), ColdFusion™ or other compilers, assemblers, interpreters or other computer languages or platforms.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

A network is a collection of links and nodes (e.g., multiple computers and/or other devices connected together) arranged so that information may be passed from one part of the network to another over multiple links and through various nodes. Examples of networks include the Internet, the public switched telephone network, the global Telex network, computer networks (e.g., an intranet, an extranet, a local-area network, or a wide-area network), wired networks, and wireless networks.

The Internet is a worldwide network of computers and computer networks arranged to allow the easy and robust exchange of information between computer users. Hundreds of millions of people around the world have access to computers connected to the Internet via Internet Service Providers (ISPs). Content providers (e.g., website owners or operators) place multimedia information (e.g., text, graphics, audio, video, animation, and other forms of data) at specific locations on the Internet referred to as webpages. Websites comprise a collection of connected, or otherwise related, webpages. The combination of all the websites and their corresponding webpages on the Internet is generally known as the World Wide Web (WWW) or simply the Web.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The flowchart and block diagrams in the figures illustrate the architecture, functionality, and operation of possible implementations of systems, methods and computer program products according to various embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

It will be readily apparent that the various methods and algorithms described herein may be implemented by, e.g., appropriately programmed general purpose computers and computing devices. Typically, a processor (e.g., a microprocessor) will receive instructions from a memory or like device, and execute those instructions, thereby performing a process defined by those instructions. Further, programs that implement such methods and algorithms may be stored and transmitted using a variety of known media.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article.

The functionality and/or the features of a device may be alternatively embodied by one or more other devices which are not explicitly described as having such functionality/features. Thus, other embodiments of the present invention need not include the device itself.

The term "computer-readable medium" as used herein refers to any medium that participates in providing data (e.g., instructions) which may be read by a computer, a processor or a like device. Such a medium may take many forms, including but not limited to, non-volatile media, volatile media, and transmission media. Non-volatile media include, for example, optical or magnetic disks and other persistent memory. Volatile media include dynamic random access memory (DRAM), which typically constitutes the main memory. Transmission media include coaxial cables, copper wire and fiber optics, including the wires that comprise a system bus coupled to the processor. Transmission media may include or convey acoustic waves, light waves and electromagnetic emissions, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, removable media, flash memory, a "memory stick", any other memory chip or cartridge, a carrier wave as described hereinafter, or any other medium from which a computer can read.

Various forms of computer readable media may be involved in carrying sequences of instructions to a processor. For example, sequences of instruction (i) may be delivered from RAM to a processor, (ii) may be carried over a wireless transmission medium, and/or (iii) may be formatted according to numerous formats, standards or protocols, such as Bluetooth, TDMA, CDMA, 3G.

Where databases are described, it will be understood by one of ordinary skill in the art that (i) alternative database structures to those described may be readily employed, (ii) other memory structures besides databases may be readily employed. Any schematic illustrations and accompanying descriptions of any sample databases presented herein are exemplary arrangements for stored representations of information. Any number of other arrangements may be employed besides those suggested by the tables shown. Similarly, any illustrated entries of the databases represent exemplary information only; those skilled in the art will understand that the number and content of the entries can be different from those illustrated herein. Further, despite any depiction of the databases as tables, an object-based model could be used to store and manipulate the data types of the present invention and likewise, object methods or behaviors can be used to implement the processes of the present invention.

A "computer system" may refer to a system having one or more computers, where each computer may include a computer-readable medium embodying software to operate the computer or one or more of its components. Examples of a computer system may include: a distributed computer system for processing information via computer systems linked by a network; two or more computer systems connected together via a network for transmitting and/or receiving information between the computer systems; a computer system including two or more processors within a single computer; and one or more apparatuses and/or one or more systems that may accept data, may process data in accordance with one or more stored software programs, may generate results, and typically may include input, output, storage, arithmetic, logic, and control units.

A "network" may refer to a number of computers and associated devices that may be connected by communication facilities. A network may involve permanent connections such as cables or temporary connections such as those made through telephone or other communication links. A network may further include hard-wired connections (e.g., coaxial cable, twisted pair, optical fiber, waveguides, etc.) and/or wireless connections (e.g., radio frequency waveforms, free-space optical waveforms, acoustic waveforms, etc.). Examples of a network may include: an internet, such as the Internet; an intranet; a local area network (LAN); a wide area network (WAN); and a combination of networks, such as an internet and an intranet.

As used herein, the "client-side" application should be broadly construed to refer to an application, a page associated with that application, or some other resource or function invoked by a client-side request to the application. A "browser" as used herein is not intended to refer to any specific browser (e.g., Internet Explorer, Safari, FireFox, or the like), but should be broadly construed to refer to any client-side rendering engine that can access and display Internet-accessible resources. A "rich" client typically refers to a non-HTTP based client-side application, such as an SSH or CFIS client. Further, while typically the client-server interactions occur using HTTP, this is not a limitation either. The client server interaction may be formatted to conform to the Simple Object Access Protocol (SOAP) and travel over HTTP (over the public Internet), FTP, or any other reliable transport mechanism (such as IBM® MQSeries® technologies and CORBA, for transport over an enterprise intranet) may be used. Any application or functionality described herein may be implemented as native code, by providing hooks into another application, by facilitating use of the mechanism as a plug-in, by linking to the mechanism, and the like.

Exemplary networks may operate with any of a number of protocols, such as Internet protocol (IP), asynchronous transfer mode (ATM), and/or synchronous optical network (SONET), user datagram protocol (UDP), IEEE 802.x, etc.

Embodiments of the present invention may include apparatuses for performing the operations disclosed herein. An apparatus may be specially constructed for the desired purposes, or it may comprise a general-purpose device selectively activated or reconfigured by a program stored in the device.

Embodiments of the invention may also be implemented in one or a combination of hardware, firmware, and software. They may be implemented as instructions stored on a machine-readable medium, which may be read and executed by a computing platform to perform the operations described herein.

More specifically, as will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

In the following description and claims, the terms "computer program medium" and "computer readable medium" may be used to generally refer to media such as, but not limited to, removable storage drives, a hard disk installed in hard disk drive, and the like. These computer program products may provide software to a computer system. Embodiments of the invention may be directed to such computer program products.

An algorithm is here, and generally, considered to be a self-consistent sequence of acts or operations leading to a desired result. These include physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like. It should be understood, however, that all of these and similar terms are to be associated with the appropriate physical quantities and are merely convenient labels applied to these quantities.

Unless specifically stated otherwise, and as may be apparent from the following description and claims, it should be appreciated that throughout the specification descriptions utilizing terms such as "processing," "computing," "calculating," "determining," or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

Additionally, the phrase "configured to" or "operable for" can include generic structure (e.g., generic circuitry) that is manipulated by software and/or firmware (e.g., an FPGA or a general-purpose processor executing software) to operate in a manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks.

In a similar manner, the term "processor" may refer to any device or portion of a device that processes electronic data from registers and/or memory to transform that electronic data into other electronic data that may be stored in registers and/or memory. A "computing platform" may comprise one or more processors.

Embodiments within the scope of the present disclosure may also include tangible and/or non-transitory computer-readable storage media for carrying or having computer-executable instructions or data structures stored thereon. Such non-transitory computer-readable storage media can be any available media that can be accessed by a general purpose or special purpose computer, including the functional design of any special purpose processor as discussed above. By way of example, and not limitation, such non-transitory computer-readable media can include RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

While a non-transitory computer readable medium includes, but is not limited to, a hard drive, compact disc, flash memory, volatile memory, random access memory, magnetic memory, optical memory, semiconductor based memory, phase change memory, optical memory, periodically refreshed memory, and the like; the non-transitory computer readable medium, however, does not include a pure transitory signal per se; i.e., where the medium itself is transitory.

It is to be understood that any exact measurements/dimensions or particular construction materials indicated herein are solely provided as examples of suitable configurations and are not intended to be limiting in any way. Depending on the needs of the particular application, those skilled in the art will readily recognize, in light of the following teachings, a multiplicity of suitable alternative implementation details.

As will now be described below with reference to the figures, many embodiments of the present invention may provide a software and/or data processing architecture that may process multiple lines of code/data simultaneously. It may be contemplated that many embodiments of the present invention may provide processing that attempts to conceptually "go wide, long, and tall at the same time" as opposed to a conceptual hour glass processing. In many embodiments of the present invention, processing multiple lines of code/data may provide faster processing speed, power and improved encryption/decryption. In some embodiments, thousands and/or millions of lines of code/data may be processed at a same time.

Figure 2:
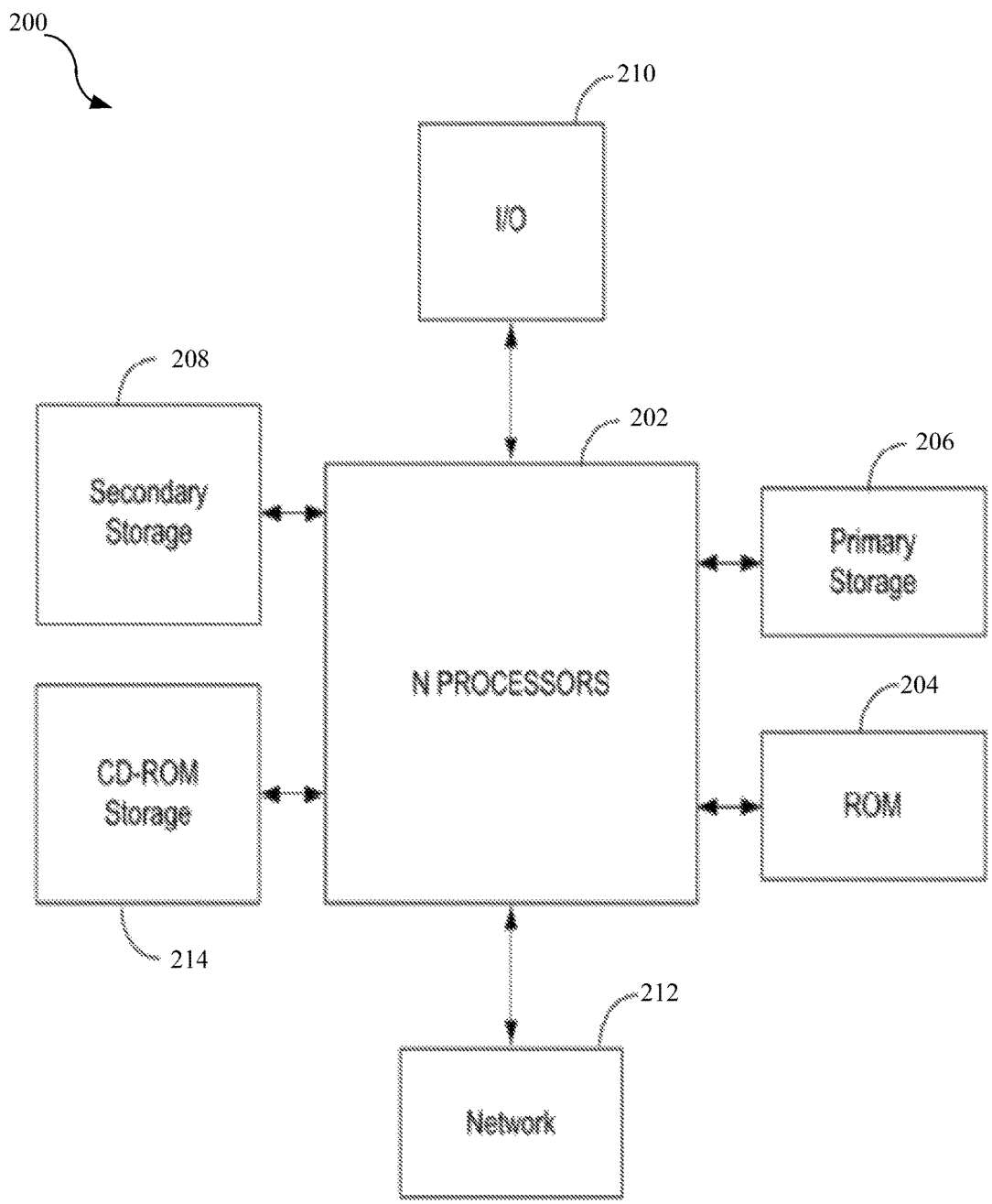
FIG. 2 illustrates am exemplary computer system, in accordance with an embodiment of the present invention.

FIG. 2 illustrates an exemplary computer system that, when appropriately configured or designed, may serve as a computer system 200, in which the present invention may be embodied. Computer system 200 may include a multiplicity of processors 202 (also referred to as central processing units, or CPUs) that may be coupled to storage devices including a primary storage 206 (typically a random access memory, or RAM), a primary storage 204 (typically a read only memory, or ROM). CPU 202 may be of various types including micro-controllers and/or nano processors, such as, and without limitation VIA Nano processors (e.g., with embedded RAM/ROM), microprocessors such as programmable devices (e.g., RISC or SISC based, or CPLDs and FPGAs), and devices not capable of being programmed such as gate array ASICs (Application Specific Integrated Circuits) or general purpose microprocessors and/or nanoprocessors. As is well known in the art, primary storage 204 may act to transfer data and instructions uni-directionally to the CPU and primary storage 206 may be used to transfer data and instructions in a bi-directional manner. The primary storage devices discussed previously may include any suitable computer-readable media such as those described above. A mass storage device 208 may also be coupled bi-directionally to CPU 202 and may provide additional data storage capacity and may include any of the computer-readable media described above. Mass storage device 208 may be used to store programs, data and the like and may be a secondary storage medium such as a hard disk. It will be appreciated that the information retained within the mass storage device 208, may, in appropriate cases, be incorporated by means known those skilled in the relevant art, as part of primary storage 206 as virtual memory. A specific mass storage device such as, and without limitation, a CD-ROM 214 may also pass data uni-directionally to the CPU.

CPU 202 may also be coupled to an interface 210 that connects to one or more input/output devices such as such as video monitors, track balls, mice, keyboards, microphones, touch-sensitive displays, transducer card readers, magnetic or paper tape readers, tablets, styluses, voice or handwriting recognizers, or other well-known input devices such as, of course, other computers. Finally, CPU 202 optionally may be coupled to an external device such as a database or a computer or telecommunications or internet network using an external connection shown generally as a network 212, which may be implemented as a hardwired or wireless communications link using suitable conventional technologies. With such a connection, the CPU might receive information from the network, or might output information to the network in the course of performing the method steps described in the teachings of the present invention.

In many embodiments of the present invention, computer system 200 may be a plane computer, wherein a plane computer may include a grouping of thousands and/or millions of processors, and the processors may be multi-core processors that may be stack into a square or other shape. Furthermore, the plane computer may process thousands and/or millions of lines of code/data by tasking one of each of the thousands and/or millions of processors to read and execute one of each of the thousands and/or millions of lines of code/data simultaneously, in a parallel fashion, on a plane. In some other embodiment the plane computer may include less than thousands of processors. In other embodiments, the plane computer may include any number of processors suitable for the needs of a particular application. In some embodiments of the present invention, thousands and/or millions of lines of code/data may be processed on one or more planes, wherein a predetermined number of multi-core processors may process each line of code/data within the one or more planes. Additionally, each line of code may be processed with their own multi-core processor on a plane. Furthermore, a multiplicity of planes of multi-core processors may be stacked such that within each plane, thousands of lines of code may be processed separately and simultaneously by each one and/or a group of the predetermined number of multi-core processors, wherein there may be no nodes. Having no nodes may provide great encryption abilities. For example, a million by a million lines of code.

In addition, each processor may be programmed differently and/or separately because each line of codes are processed separately. In some embodiments, processing of each line of code separately with different processors helps alleviate hacking of the system because each processor only reads or executes lines of code in it's assigned plane. In an alternative embodiment, the system includes a plurality of nodes where data gets switched back and forth between the lines of code.

Figure 3:
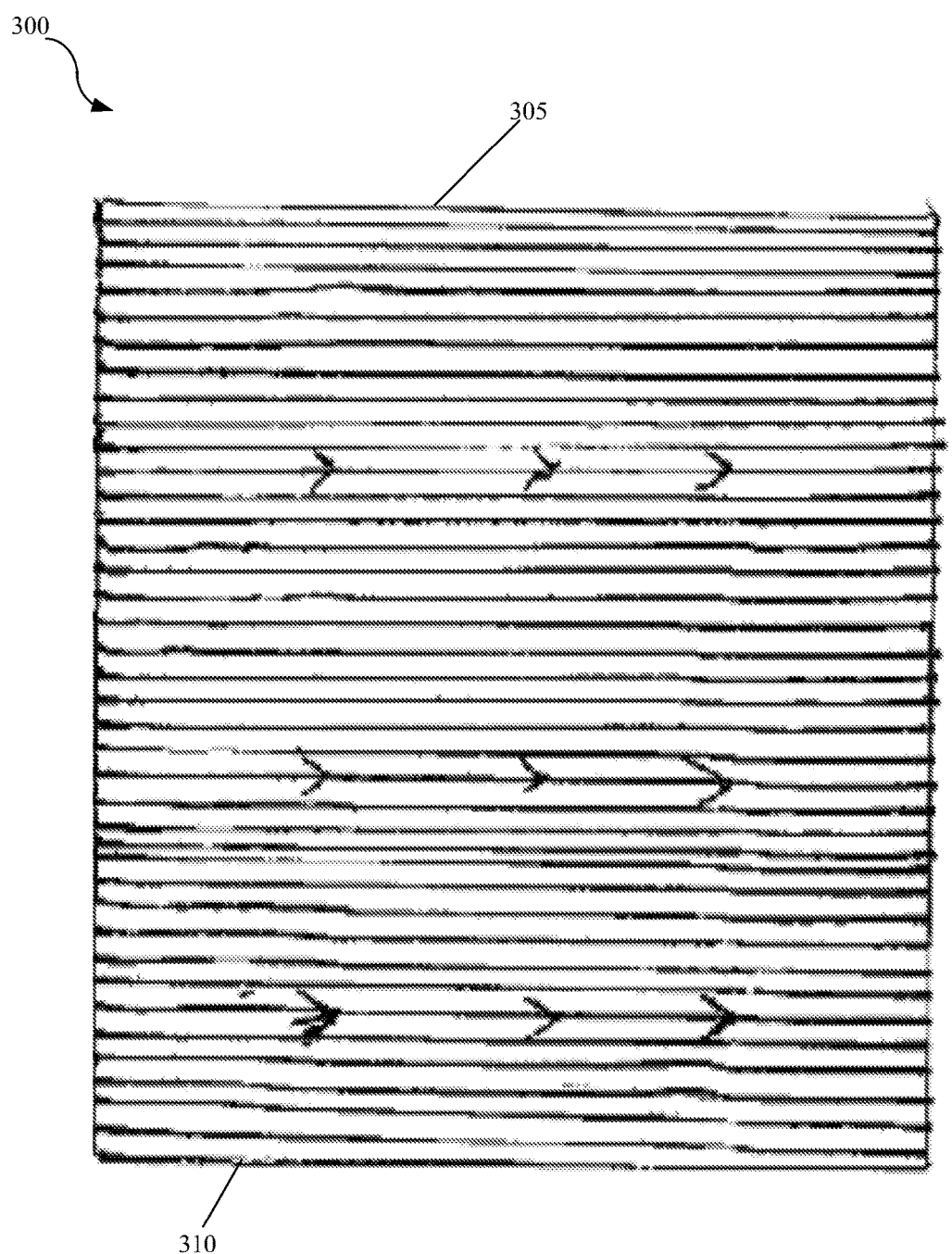
FIG. 3, illustrates an exemplary plane of a plane computer, in accordance with an embodiment of the present invention.

FIG. 3, illustrates an exemplary plane 300 of the plane computer, in accordance with an embodiment of the present invention. As illustrated, by way of example, and without limitation, a plane may include a multiplicity of processors that may process a multiplicity of lines of code/data respectively, in parallel, wherein a sampling of the multiplicity of lines of code may be denoted as a first line of code/data 305 and an n-th line of code/data 310 where n may be any positive integer. Furthermore, each line of code/data of the multiplicity of lines of code/data may be processed by one or more processors, wherein the one or more processors may read across each line of code/data, to execute the line of code/data and possibly produce output without the one or more processors potentially having to proceed down from one line of code/data to another line of code/data since each vertically differing line of code/data may be processed by a corresponding one or more processors. It may be contemplated that by processing the lines of code separately with separate processors without nodes, an external source may encounter more difficulty when attempting to read and/or hack the code/data of the system. Those skilled in the art will appreciate that from a theoretical point of view, one potential theory of operation may be that without nodes and with separated processors, cross communication through the nodes may not be readily available, therefore potential access into one processor and thus one line of code/data may not allow access to other processors and thus other lines of code/data. Furthermore, each processor may include a different operating configuration, wherein an operating configuration may include a particular hardware configuration and programming configuration, such that in a case that a hacking technique may gain access to a particular processor with a particular operating configuration, the hacking technique may not also gain access to the other processors, wherein each may have a different operating configuration. In some embodiments planes of the system may include a multiplicity of intra-plane and/or inter-plane nodes or a combination thereof. In some embodiments, by way of example, and without limitation, an exemplary, and without limitation, plane computer system may include an exemplary, without limitation, 32 lines of code/data on a plane, wherein each line of code/data may be processed by one or more multi-core processors such that the exemplary plane computer system may include at least 32 multi-core processors, furthermore, by further way of example, and without limitation, one or more particular lines of code on the plane may be processed by more than one processor such that, the exemplary plane computer system may include more than 32 multi-core processors.

While the embodiments have exemplified that a plane computer system may be shown by way of example, and without limitation, using a single plane, it may contemplated that those skilled in the art, in light of the teachings of the present invention, will readily recognize and appreciate that the teachings of the present invention may be applied to using a multiplicity of stacked planes, wherein any number of the multiplicity of stacked planes may be suitable for the needs of a particular application and also may be stacked to form substantially any shape suitable for the needs of the particular application. By way of example, and not limitation, suitable alternative configurations may include multi-core processors stacked in a cube, round, or circular shape.

Figure 4:
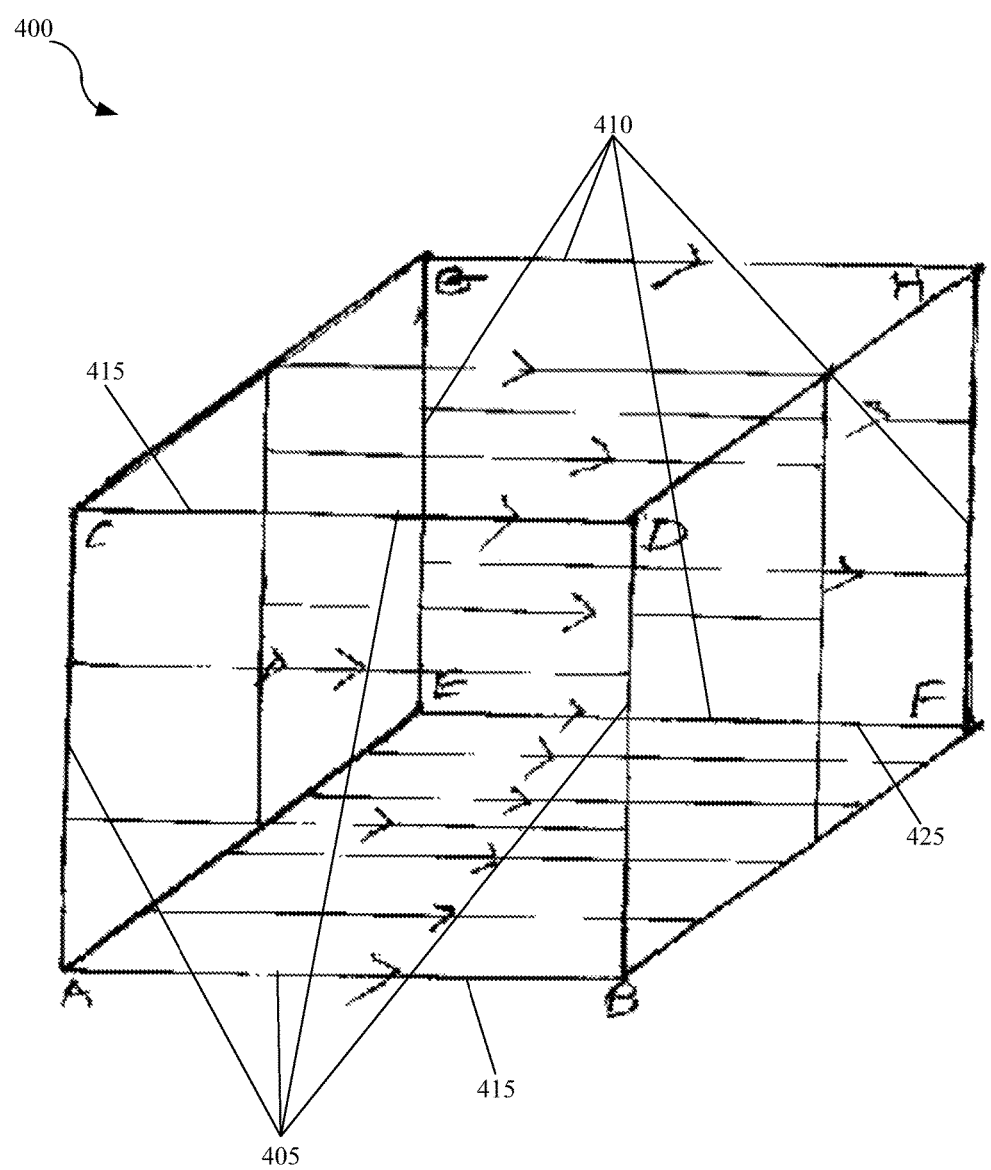
FIG. 4, illustrates an exemplary configuration of a multiplicity of planes of a plane computer system, in accordance with an embodiment of the present invention.

FIG. 4, illustrates an exemplary configuration of a multiplicity of planes of a plane computer system 400, in accordance with an embodiment of the present invention. As illustrated, by way of example, and without limitation, a multiplicity of planes may be stacked and may be configured as a cube, wherein a sampling of planes may be denoted as a first plane 405 (ACDB) and an m-th plane 410 (EGHF), where m may be any positive integer. Furthermore, plane computer system 400, may include a multiplicity of processors that may process a multiplicity of lines of code/data respectively in parallel, wherein the multiplicity of lines of code/data may be denoted as a first line of code/data 415, an n-th line of code/data 420 where n may be any positive integer, and an x-th line of code/data 425 where x may be a multiplicative product of n and m. Moreover, each line of code/data may be processed by a corresponding one or more processors in parallel such that plane computer system 400 may include at least an x number of processors, furthermore, one or more particular lines of the x number of lines of code/data may be processed by more than one processor such that plane computer system 400 may include a total number of processor that may be greater than x. In some embodiments plane computer system 400, may include one thousand lines of code/data, wherein each of the one thousand lines of code/data may be processed by one or more multi-core processors stacked to make a cube, such that the plane computer system may include at least one thousand multi-core processors or more than one thousand multi-core processors. In another embodiment, plane computer system 400 may include one million lines of code/data, wherein each of the one million lines of code/data may be processed by one or more multi-core processers, such that the plane computer system may include at least one million multi-core processors or more than one million multi-core processors. In another embodiment, plane computer system 400 may include one trillion lines of code/data, wherein each of the one trillion lines of code/data may be processed by one or more multi-core processers, such that the plane computer system may include at least one trillion multi-core processors or more than one trillion multi-core processors. In many embodiments, plane computer system 400 may also include a frame which may house the multiplicity of processors, wherein the fame may be an optimal cube shape. Those skilled in the art, in light of and in accordance with the teachings of the present invention may readily recognize that the frame may be configured as substantially any shape suitable for the needs of a particular application, wherein shape considerations may depend on for example, and without limitation, space requirements, preexisting structures, maximizing space usage efficiently, etc.

In some alternative embodiments of the present invention, data output from each processor, after processing each line of code/data, may be passed into one or more gathering processors, wherein the one or more gathering processors may be programmed to process the output data, as a whole, for further use by other components of a plane computer system.

Figure 5:
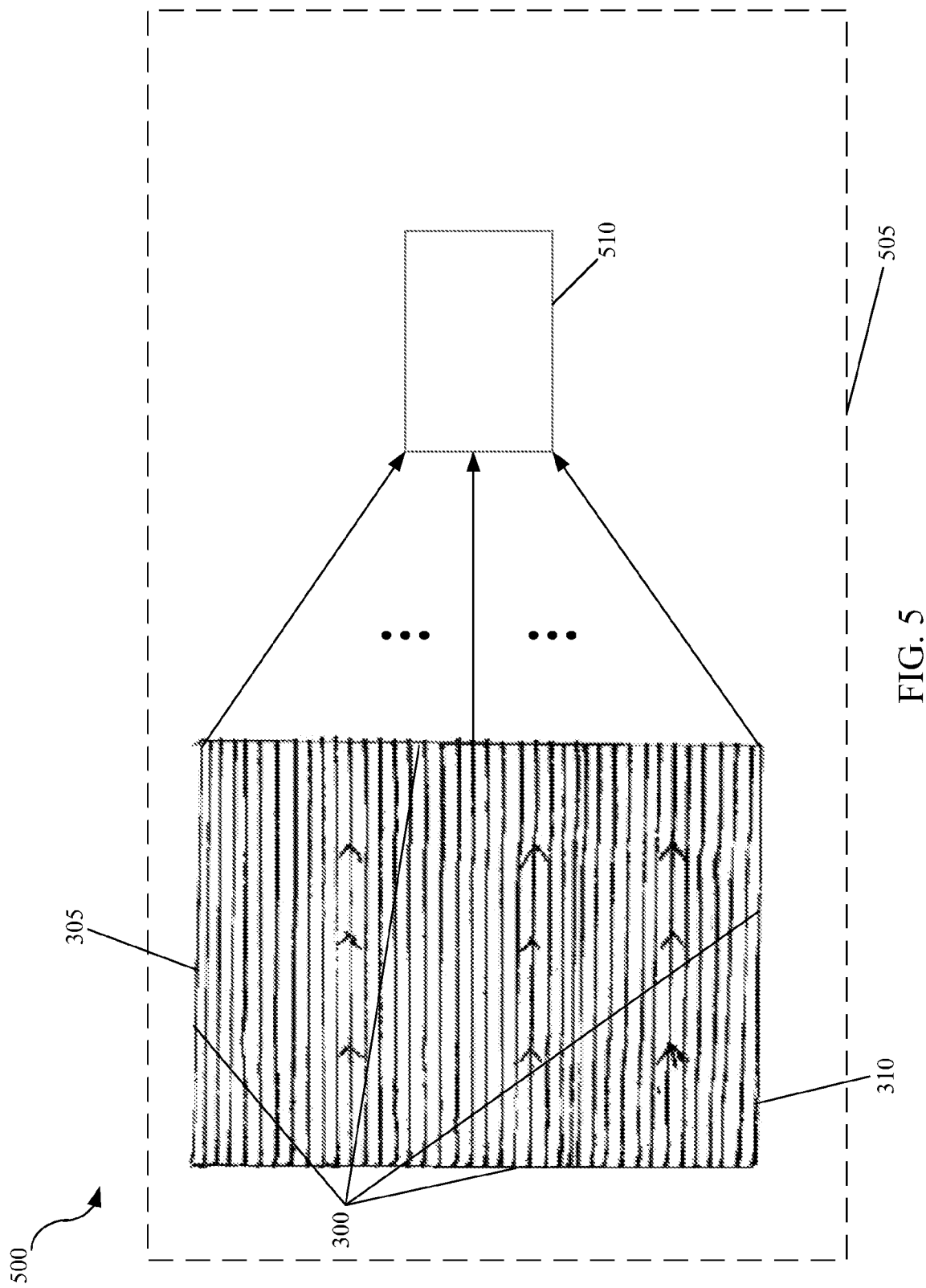
FIG. 5, illustrates an exemplary configuration of processors of a plane computer system, in accordance with an embodiment of the present invention.

FIG. 5 illustrates an exemplary configuration 500 of processors of a plane computer system, in accordance with an embodiment of the present invention. In the present alternative embodiment, and with reference to FIG. 3, plane computer system 505, may further include a same gathering processor 510 operably coupled to each of a multiplicity of processors processing first line of code/data 305 through n-th line of code/data 310 respectively, of plane 300, in order to possibly receive output data from a potentially processed first through nth line of code/data where n may be any positive integer.

Figure 6:
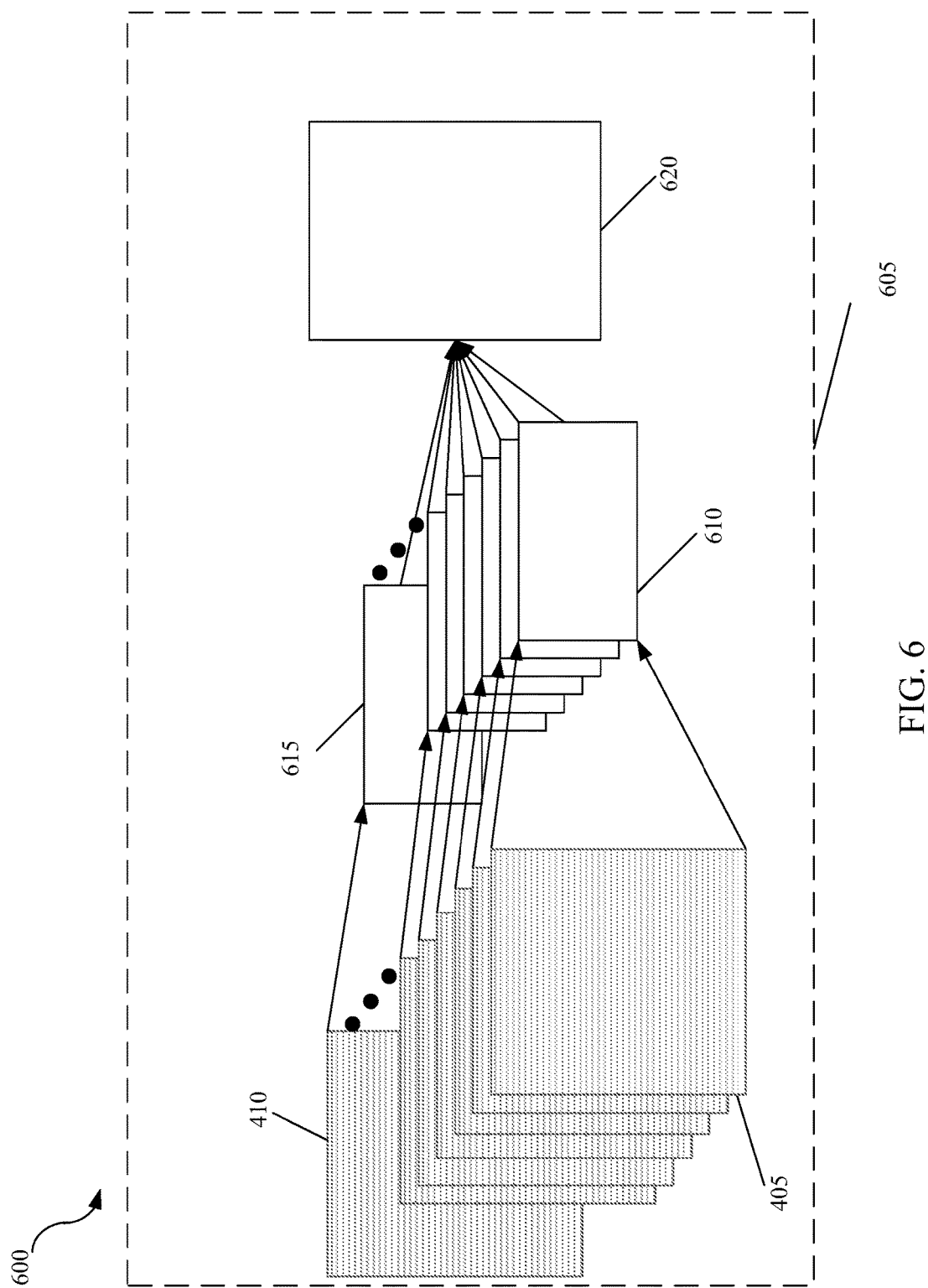
FIG. 6, illustrates another exemplary configuration of processors of a plane computer system, in accordance with an embodiment of the present invention.

Furthermore FIG. 6, illustrates another exemplary configuration 600 of processors of a plane computer system, in accordance with an embodiment of the present invention. In the present alternative embodiment, and with reference to FIG. 4 and FIG. 5, plane computer system 605, may further include a multiplicity of gathering processors and a multiplicity of planes of processors, wherein each of a multiplicity of gathering processors may be operably coupled to a corresponding plane of processors respectively. Furthermore, each gathering processor, operably coupled to a corresponding plane of processors, may particularly be operably coupled to each processor within a respective plane, as illustrated in FIG. 5, such that plane computer 605 may include a same number of planes and gathering processors. Furthermore, each gathering processor may possibly receive output data from a potentially processed first through n-th line of code/data, where n may be any positive integer, from each corresponding plane. A sampling of the multiplicity of gathering processors may be denoted as a first gathering processor 610 and an m-th gathering processor 615, wherein m may be any positive integer and a sampling of the multiplicity of plans may be denoted as a first plane 405 and an m-th plane 410. Plane computer system 605 may further include a focusing processor 620, wherein a focusing processors may be couple to the first through m-th gathering processors. The focusing processor may further be programed to process output data from the first through m-th gathering processors, as a whole, for further use by other components of a plane computer system. It may be contemplated that an amount of data to be processed by the gathering processors may be greatly reduced by processing performed by each processor for each line of code/data, furthermore, an amount of data to be processed by the focusing processor may also be greatly reduced by processing performed by each of the gathering processors.

While the embodiments have exemplified that a plane computer system may be shown by way of example, and without limitation, using a single gathering processor per plane and also using a single focusing processor, it may contemplated that those skilled in the art, in light of the teachings of the present invention, will readily recognize and appreciate that the teachings of the present invention may be applied to using a multiplicity of gathering processors per plane and also a multiplicity of focusing processors, wherein substantially any number of gathering processors may be configured to be operably coupled to substantially any number of planes, and furthermore, substantially any number of focusing processors may be configured to be operable coupled to the substantially any number the multiplicity of gathering processors for the suitable needs of a particular application. Moreover, substantially any configuration may be used for the needs of the particular application, such as, and without limitation, particular gathering processors possibly being operably coupled to more than one plane, while other gathering processors may only be operably couple to one corresponding plane, and also a particular focusing processor may be operably coupled to a subset of gathering processors while another focusing processor may be operably coupled to the remaining gathering processors. In a case that a multiplicity of focusing processing processors may be utilized, the focusing processors may be operable coupled to each other in a decreasing cascading organization.

Figure 7:
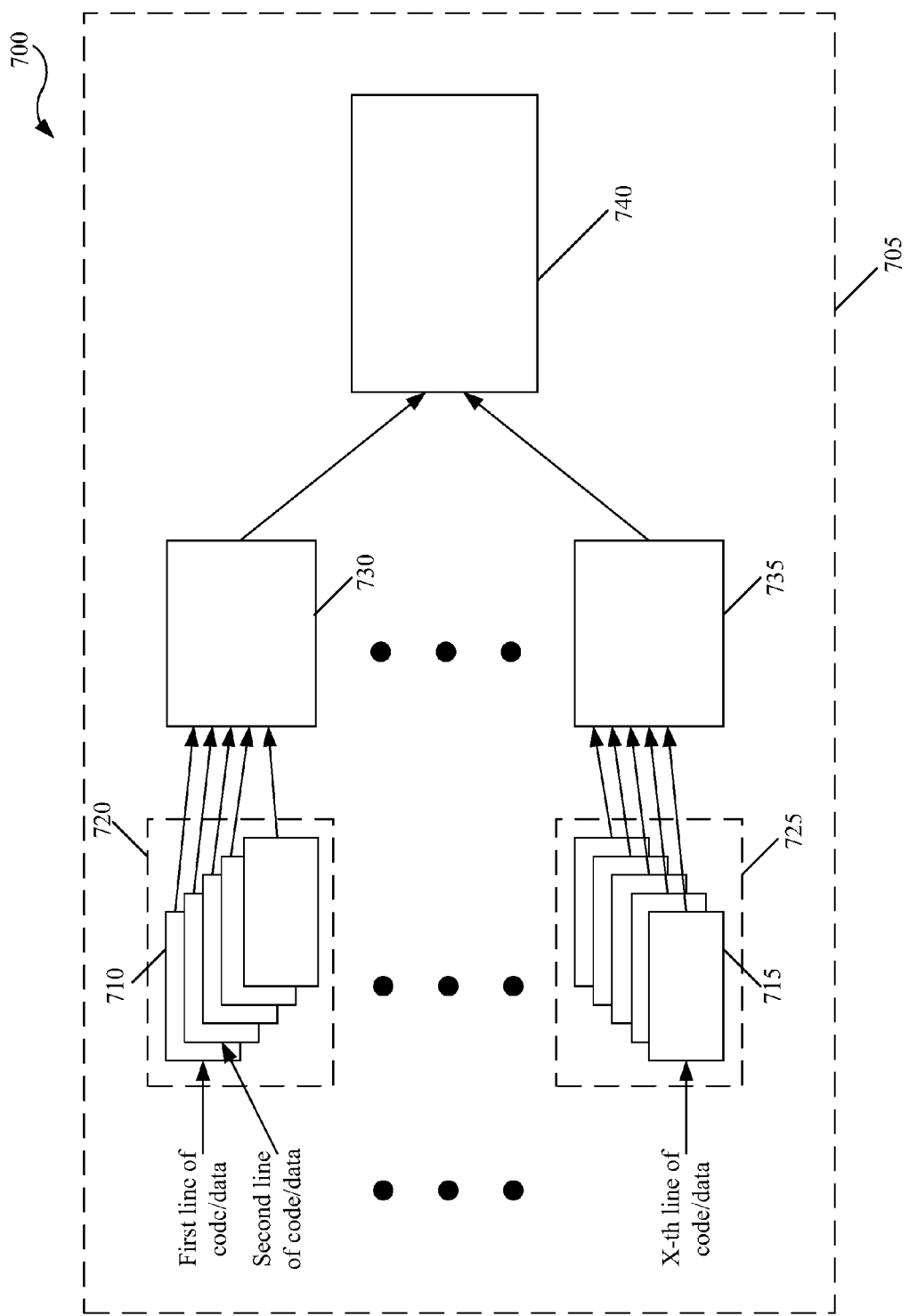
FIG. 7 illustrates a software module architecture of an exemplary plane computer system, in accordance with an embodiment of the present invention.

FIG. 7 illustrates a software module architecture 700 of an exemplary plane computer system 705, in accordance with an embodiment of the present invention. In the present alternative embodiment, and with reference to FIG. 4, the plane computer system may include a multiplicity of processing modules organized on a multiplicity of planes, wherein the multiplicity of processing modules may include executable computer-readable instructions that when executed may cause the processing modules to potentially process a multiplicity of lines of code/data, respectively. A sampling of the multiplicity of processing modules may be denoted as a first processing module 710 and an x-th processing module 715, where x may be any positive integer and may represent a total number of lines of code/data, furthermore, a sampling of the multiplicity of planes may be denoted as a first plane 720 and an m-th plane 725, where m may be any positive integer and may represent a total number of planes. The plane computer system may further include a multiplicity of gathering modules that may be operably coupled to a subset of the multiplicity of processing modules, wherein the multiplicity of gathering modules may include executable computer-readable instructions that when executed may cause the gathering modules to receive and further process output from the subset of the multiplicity of processing modules. A sampling of the multiplicity of gathering modules may be denoted as a first gathering module 730 and an M-th gathering module 735, where M may be any positive integer and M may represent a total number of gathering modules. In many embodiments, M may be less than or equal to the total number of lines of code/data. In many alternative embodiments a subset may be any number between one and the total number of lines of code/data. In the present alternative embodiment, the subset may optimally include a same number as a number of processing modules in a plane. In some other alternative embodiments a total number of gathering modules may be less than a total number of lines of code/data and more than a total number of planes. In yet another alternative embodiment, a total number of gathering modules may be less than a total number of lines of code/data and less than a number of planes. In still another alternative embodiment a total number of gathering modules may be more than a total number of lines of code/data. In the present alternative embodiment, the plane computer system may further include a focusing module 740 which may be operably coupled to the first through m-th gathering modules, wherein the focusing module may further include executable computer-readable instructions that when executed may cause the gathering module to receive and further process output from the gathering modules in order to process data and provide data to other components of the plane computer system. In some alternative embodiments, the plane computer system may include a multiplicity of focusing modules, wherein each focusing module may be operably coupled to a subset of gathering modules and further may be operably coupled to another level of focusing modules. For example, and without limitation, the plane computer system may include a multiplicity of focusing modules wherein a first level of focusing modules may include for example, and without limitation five focusing modules, wherein each focusing module may be operably coupled to a different grouping of 100 gathering modules, and also each of the 5 focusing modules may be further operably coupled to a same focusing module in a second level. Those skilled in the relevant art, in light of and in accordance with the teachings of the present invention will readily recognize that substantially any number of focusing modules may be operably coupled to substantially any number of gathering modules and other focusing modules in substantially any number of levels for the needs suitable for particular applications.

Those skilled in the art will readily recognize, in light of and in accordance with the teachings of the present invention, that any of the foregoing steps and/or system modules may be suitably replaced, reordered, removed and additional steps and/or system modules may be inserted depending upon the needs of the particular application, and that the systems of the foregoing embodiments may be implemented using any of a wide variety of suitable processes and system modules, and is not limited to any particular computer hardware, software, middleware, firmware, microcode and the like. For any method steps described in the present application that can be carried out on a computing machine, a typical computer system can, when appropriately configured or designed, serve as a computer system in which those aspects of the invention may be embodied.

It is noted that according to USA law, all claims must be set forth as a coherent, cooperating set of limitations that work in functional combination to achieve a useful result as a whole. Accordingly, for any claim having functional limitations interpreted under 35 USC § 112 (6) where the embodiment in question is implemented as a client-server system with a remote server located outside of the USA, each such recited function is intended to mean the function of combining, in a logical manner, the information of that claim limitation with at least one other limitation of the claim. For example, in client-server systems where certain information claimed under 35 USC § 112 (6) is/(are) dependent on one or more remote servers located outside the USA, it is intended that each such recited function under 35 USC § 112 (6) is to be interpreted as the function of the local system receiving the remotely generated information required by a locally implemented claim limitation, wherein the structures and or steps which enable, and breathe life into the expression of such functions claimed under 35 USC § 112 (6) are the corresponding steps and/or means located within the jurisdiction of the USA that receive and deliver that information to the client (e.g., without limitation, client-side processing and transmission networks in the USA). When this application is prosecuted or patented under a jurisdiction other than the USA, then "USA" in the foregoing should be replaced with the pertinent country or countries or legal organization(s) having enforceable patent infringement jurisdiction over the present application, and "35 USC § 112 (6)" should be replaced with the closest corresponding statute in the patent laws of such pertinent country or countries or legal organization(s).

All the features disclosed in this specification, including any accompanying abstract and drawings, may be replaced by alternative features serving the same, equivalent or similar purpose, unless expressly stated otherwise. Thus, unless expressly stated otherwise, each feature disclosed is one example only of a generic series of equivalent or similar features.

It is noted that according to USA law 35 USC § 112 (1), all claims must be supported by sufficient disclosure in the present patent specification, and any material known to those skilled in the art need not be explicitly disclosed. However, 35 USC § 112 (6) requires that structures corresponding to functional limitations interpreted under 35 USC § 112 (6) must be explicitly disclosed in the patent specification. Moreover, the USPTO's Examination policy of initially treating and searching prior art under the broadest interpretation of a "mean for" claim limitation implies that the broadest initial search on 112(6) functional limitation would have to be conducted to support a legally valid Examination on that USPTO policy for broadest interpretation of "mean for" claims. Accordingly, the USPTO will have discovered a multiplicity of prior art documents including disclosure of specific structures and elements which are suitable to act as corresponding structures to satisfy all functional limitations in the below claims that are interpreted under 35 USC § 112 (6) when such corresponding structures are not explicitly disclosed in the foregoing patent specification. Therefore, for any invention element(s)/structure(s) corresponding to functional claim limitation(s), in the below claims interpreted under 35 USC § 112 (6), which is/are not explicitly disclosed in the foregoing patent specification, yet do exist in the patent and/or non-patent documents found during the course of USPTO searching, Applicant(s) incorporate all such functionally corresponding structures and related enabling material herein by reference for the purpose of providing explicit structures that implement the functional means claimed. Applicant(s) request(s) that fact finders during any claims construction proceedings and/or examination of patent allowability properly identify and incorporate only the portions of each of these documents discovered during the broadest interpretation search of 35 USC § 112 (6) limitation, which exist in at least one of the patent and/or non-patent documents found during the course of normal USPTO searching and or supplied to the USPTO during prosecution. Applicant(s) also incorporate by reference the bibliographic citation information to identify all such documents comprising functionally corresponding structures and related enabling material as listed in any PTO Form-892 or likewise any information disclosure statements (IDS) entered into the present patent application by the USPTO or Applicant(s) or any $3^{rd}$ parties. Applicant(s) also reserve its right to later amend the present application to explicitly include citations to such documents and/or explicitly include the functionally corresponding structures which were incorporate by reference above.

Thus, for any invention element(s)/structure(s) corresponding to functional claim limitation(s), in the below claims, that are interpreted under 35 USC § 112 (6), which is/are not explicitly disclosed in the foregoing patent specification, Applicant(s) have explicitly prescribed which documents and material to include the otherwise missing disclosure, and have prescribed exactly which portions of such patent and/or non-patent documents should be incorporated by such reference for the purpose of satisfying the disclosure requirements of 35 USC § 112 (6). Applicant(s) note that all the identified documents above which are incorporated by reference to satisfy 35 USC § 112 (6) necessarily have a filing and/or publication date prior to that of the instant application, and thus are valid prior documents to incorporated by reference in the instant application.

Having fully described at least one embodiment of the present invention, other equivalent or alternative methods of implementing parallel computing according to the present invention will be apparent to those skilled in the art. Various aspects of the invention have been described above by way of illustration, and the specific embodiments disclosed are not intended to limit the invention to the particular forms disclosed. The particular implementation of the parallel computer system may vary depending upon the particular context or application. By way of example, and not limitation, the parallel computer system and architectures described in the foregoing were principally directed to processing a multiplicity of lines of software/data implementations; however, similar techniques may instead be applied to processing data with related to weather forcasts and data, military/defense, science, government, space, climate change, engineering, search engines, security, increase processing speed, spam filters, data storage, super computers, social media, schools which implementations of the present invention are contemplated as within the scope of the present invention. The invention is thus to cover all modifications, equivalents, and alternatives falling within the spirit and scope of the following claims. It is to be further understood that not all of the disclosed embodiments in the foregoing specification will necessarily satisfy or achieve each of the objects, advantages, or improvements described in the foregoing specification.

Claim elements and steps herein may have been numbered and/or lettered solely as an aid in readability and understanding. Any such numbering and lettering in itself is not intended to and should not be taken to indicate the ordering of elements and/or steps in the claims.

The corresponding structures, materials, acts, and equivalents of all means or step plus function elements in the claims below are intended to include any structure, material, or act for performing the function in combination with other claimed elements as specifically claimed.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The Abstract is provided to comply with 37 C.F.R. Section 1.72(b) requiring an abstract that will allow the reader to ascertain the nature and gist of the technical disclosure. That is, the Abstract is provided merely to introduce certain concepts and not to identify any key or essential features of the claimed subject matter. It is submitted with the understanding that it will not be used to limit or interpret the scope or meaning of the claims.

The following claims are hereby incorporated into the detailed description, with each claim standing on its own as a separate embodiment.

What is claimed is:

1. A system comprising:
   a first line of code or data;
   a first plane, wherein said first plane being configured to receive said first line of code or data;
   a first processor, in which said first processor is running a first operating configuration, wherein said first processor is configured to, at least read and execute or process said first line of code or data;
   a second line of code differing from said first line of code or data;
   a second plane, wherein said second plane being configured to receive said second line of code or data;
   a second processor, in which said second processor is running a second operating configuration different from said first operating configuration, wherein said second processor is configured to, at least read and execute or process said second line of code separately and simultaneously or in parallel from said first line of code or data;
   a third line of code differing from said first and second line of code or data;
   a third plane, wherein said third plane being configured to receive said third line of code or data; and
   a third processor, in which said third processor is running a third operating configuration different from said first and second operating configuration, wherein said third processor is configured to, at least read and execute or process said third line of code separately and simultaneously from said first and second line of code or data, wherein said processing of said first, second, and third lines of code or data separately and simultaneously or in parallel with separate processors is configured to prevent an external source from reading or hacking said lines of code or data, and wherein said processing of said first, second, and third lines of code or data separately and simultaneously with separate processors running a first, second, and third operating configuration, is configured to further prevent or alleviate a hacking of said system since each processor is running different operating configurations in addition to running different lines of code or data separately.

2. The system of claim 1, further comprising at least a fourth line of code differing from said first, second and third lines of code or data.

3. The system of claim 2, further comprising at least a fourth plane, wherein said fourth plane being configured to receive said fourth line of code or data.

4. The system of claim 3, further comprising at least a fourth processor, wherein said fourth processor is configured to, at least read and execute or process said fourth line of code or data, wherein said processing of said lines of code or data separately and simultaneously with separate processors is configured to prevent an external source from reading or hacking said lines of code or data.

5. The system of claim 4, in which each of said processors is configured to operate with no nodes, wherein each of said processors having no nodes is configured to enable better encryption capability.

6. The system of claim 1, further comprising at least a gathering module that is configured to receive output data from said first, second, and third processors, wherein said first, second, and third processors are configured to reduce a processing time of said output data.

7. The system of claim 6, further comprising at least a focusing module coupled to said gathering module.

8. The system of claim 7, further comprising at least an executable computer-readable instruction, wherein said executable computer-readable instruction is configured to cause said focusing module to receive and further process output data from said gathering module.

9. The system of claim 1, further comprising at least four or more differing lines of code or data.

10. The system of claim 9, further comprising at least four or more planes, wherein each of said four or more planes being configured to receive each of said four or more lines of code or data.

11. The system of claim 10, further comprising at least four or more processors, wherein each of said four or more processors are configured to read or execute or process each of said four or more lines of code or data with no nodes, wherein said processing of said lines of code or data separately and simultaneously with separate processors is configured to prevent an external source from reading or hacking said lines of code or data since each processor only reads or executes lines of code in their assigned plane, and wherein said processing of said lines of code or data separately and simultaneously with separate processors having no nodes is configured to enable better encryption capability.

12. The system of claim 11, in which each of said at least four or more processors include different operating configuration, wherein said different operating configuration is configured to further prevent said external source from reading or hacking said lines of code or data.

13. The system of claim 12, further comprising at least a plurality of gathering module that is configured to receive and process output data from said processors.

14. The system of claim 13, further comprising at least a plurality of focusing module coupled to said gathering module.

15. The system of claim 14, further comprising at least an executable computer-readable instruction, wherein said executable computer-readable instruction is configured to cause said focusing module to receive and further process output data from said gathering module.

16. A system consisting of:
a first operating configuration;
a first line of code or data;
means for running said first operating configuration and for receiving said first line of code or data;
means configured to, at least read and execute or process said first line of code or data;
a second operating configuration;
a second line of code differing from said first line of code or data;
means for running said second operating configuration and for receiving said second line of code or data;
means configured to, at least read and execute or process said second line of code separately and simultaneously or in parallel from said first line of code or data;
a third operating configuration;
a third line of code differing from said first and second line of code or data;
means configured to receive said third line of code or data and for running said third operating configuration; and
means configured to, at least read and execute or process said third line of code separately and simultaneously or in parallel from said first and second line of code or data, wherein said processing of said first, second, and third lines of code or data separately and simultaneously or in parallel with separate processors is configured to prevent an external source from reading or hacking said lines of code or data, and wherein said processing of said first, second, and the third lines of code or data separately and simultaneously with separate processors running a first, second, and third operating configuration, is configured to further prevent or alleviate a hacking of said system since each processor is running different operating configurations in addition to running different lines of code or data separately.

17. The system of claim 16, further comprising a first means for receiving output data from said line of code reading or executing means, wherein said line of code reading or executing means are configured to reduce a processing time of said output data.

18. The system of claim 17, further comprising a second means for receiving output from said first output data receiving means.

19. The system of claim 18, further comprising means configured to cause said second output data receiving means, to receive and further process output data from said first output data receiving means.

20. A method comprising:
running, with a first processor, a first operating configuration;
receiving, with said first processor, a first line of code or data on a first computer data plane;
reading said first line of code or data with said first processor;
executing or processing said first line of code or data with said first processor;
running, with a second processor, a second operating configuration;
receiving, with said second processor, a second line of code or data on a second computer data plane;
reading said second line of code or data separately and simultaneously from said first line of code or data with said second processor;
executing or processing said second line of code or data separately and simultaneously or in parallel from said first line of code or data with said second processor;
running, with a third processor, a third operating configuration;
receiving, with said third processor, a third line of code or data on a third computer data plane;
reading said third line of code separately and simultaneously from said first and second line of code or data with said third processor;
executing or processing said third line of code separately and simultaneously or in parallel from said first and second line of code or data with said third processor, wherein said reading and executing or processing of said first, second, and third lines of code or data separately and simultaneously or in parallel with separate processors is configured to prevent an external source from reading or hacking said lines of code or data, and wherein said processing of said first, second, and third lines of code or data separately and simultaneously with separate processors running a first, second, and third operating configuration, is configured to further prevent or alleviate a hacking of said system since each processor is running different operating configurations in addition to running different lines of code or data separately; and
receiving output data from said first, second and third processors, wherein said first, second and third processors are configured to reduce a processing time of said output data.

* * * * *